Patented Aug. 20, 1935

2,011,573

UNITED STATES PATENT OFFICE 2,011,573

RESINOUS COMPLEXES AND COMPOSITIONS OF SYNTHETIC ORIGIN CONTAINING SULPHUR AND PROCESS OF MAKING SAME

Carleton Ellis, Montclair, N. J., assignor to Ellis-Foster Company, a corporation of New Jersey No Drawing. Application June 15, 1929,
Serial No. 371,307

3 Claims. (Cl. 260—3)

Ammonium thiocyanate reacts with aldehydic bodies such as formaldehyde producing with the latter solid products which may be classed as resins. The present invention relates to resinous complexes which contain ammonium thiocynate aldehyde resin as an added component or as an inter-reacted part.

The invention will be illustrated particularly by resins formed by the reaction or inter-reaction of urea, ammonium thiocyanate and formaldehyde; or urea, thiourea ammonium thiocyanate and formaldehyde but it should be understood that these illustrations are not to be interpreted as limiting the scope of the invention in any manner.

The reaction between ammonium thiocyanate and formaldehyde is greatly modified if urea, thiourea and the like is present. Presumably in these circumstances inter-reaction occurs between urea, thiocyanate and aldehyde. When a mixture of urea, thiourea and ammonium thiocyanate is similarly reacted with formaldehyde, products which may be looked upon as still more complex are derived.

These products cover a wide range of fusibility, hardness and other chemical and physical properties and certain of them are desirable for use in various phases of the plastic industry, including the production of molded articles, especially those light in color or colored to tints which are not impaired by any disturbance of pure tonal quality due to a resinous binder of a dark color.

The manner in which the invention may be carried out to obtain binders suitable for use in the plastic industry or for impregnating and other purposes is illustrated by the following examples:

*Example 1.*—One molecular equivalent each of urea and of ammonium thiocyanate were dissolved in a 35–40% aqueous solution of formaldehyde containing two molecular equivalents of the aldehyde. The solution caused lowering of the temperature but, when it was completed, the liquid warmed up considerably owing to the reaction. The whole became turbid and presently solidified to a substance resembling (except in color) coagulated white of egg. This was heated at 90°–100° C. to remove water. On extraction of the powdered dry product with cold water 16.6% of its weight was dissolved. The product of this reaction was a clear pale yellow solid, becoming plastic on heating.

*Example 2.*—Equimolecular proportions of urea and ammonium thiocyanate were dissolved in 35–40% formaldehyde aqueous solution containing 3 molecular equivalents of the aldehyde. As soon as solution was complete, considerable heat was developed and gradually the whole was converted into a tough yellowish white solid which, on standing, became fairly hard. This became clear at 100° C., yielding a substance which on cooling was hard and glassy. This product became plastic on heating.

*Example 3.*—One molecular equivalent each of urea and ammonium thiocyanate were dissolved in aqueous solution of formaldehyde containing four molecular equivalents of the aldehyde and the mixture was quickly rendered neutral to phenolphthalein. The return of a faint pink coloration was noted. Evaporated to dryness below 100° C., this solution yielded a tough, clear, yellow solid becoming plastic on heating.

*Example 4.*—One molecular equivalent each of thiourea and ammonium thiocyanate were dissolved in an aqueous solution of formaldehyde containing four equivalents of formaldehyde. The solution was quickly rendered neutral to phenolphthalein. No return of the pink color was noted in this case. Evaporated to dryness below 100° C., this solution yielded an almost colorless tough solid which became plastic on heating.

*Example 5.*—One molecular equivalent each of urea, ammonium thiocyanate and thiourea were dissolved in aqueous formaldehyde containing six molecular equivalents of the aldehyde. The solution was quickly rendered just neutral to phenolphthalein by the addition of sodium hydroxide solution. A just visible pink tinge returned. The resulting solution warms up but shows no visible sign of reaction. Evaporated at a temperature below 100° C. this yielded a clear tough solid of a faint yellowish tinge, which became plastic on heating.

While it is preferable to carry out the reaction to make the thiocyanate complex in a solution which is neutral or very slightly acid due to presence of formic acid in formaldehyde solution used, I may add an acid catalyst of reaction or in some cases carry out the reaction in the presence of an alkaline catalyst. In like manner salts having an acid or alkaline reaction may be employed. In certain of the foregoing examples I have noted that after neutralization a slight change takes place which indicates a departure from complete neutrality. I may, in some cases, continue to add the neutralizing agent to maintain a condition of complete neutrality, with the particular indicator used, during the course of the reaction. The resinification may be carried out at room temperature or at higher temperatures. In some cases cooling may be employed to maintain at any definite temperature, including a range below room temperature. The operation may be carried out in open vessels or those equipped with a reflux condenser or in tightly closed autoclaves. The resinous product of the reaction may be used alone or mixed with various other synthetic solids such as urea formaldehyde resin, ureathiourea formaldehyde resin, various other resins containing sulphur, phenol formaldehyde resin and so forth. Casein, glue, alginic acid and alginates, gum tragacanth and various other modifying bodies may be incorporated in special cases. The reaction of formaldehyde on thiocyanate, with or without urea or thiourea, may be carried out, if desired, in the presence of phenol or other phenolic body reactive with aldehydes to produce a co-resinified material. The employment of other aldehydes reacting in a manner similar or analogous to formaldehyde likewise is not precluded. With respect to fillers, it should be noted that I may use the common mineral fillers generally employed in the plastic industry and prefer those of an organic character, such as ground wood or wood flour, cotton, flock, and the like.

Instead of reacting altogether the various components entering into the composition of the resin of the present invention I may, in some cases, react with the formaldehyde on each of the other ingredients separately and thereafter mix the products of the reaction; or may mix or combine such separately reacted compositions at any stage in the course of the reaction: it being within the range of the invention to react with the aldehyde on the other substances jointly, separately or in any order of admixture, thereby modifying the character of the resulting product in corresponding degree.

What I claim is:

1. The process of producing thermoplastic condensation products which comprises dissolving one molecular equivalent each of urea and of ammonium thiocyanate in two molecular equivalents of a 35–40% aqueous solution of formaldehyde, permitting the components of the solution to react to form a solid reaction product, and heating such product at a temperature of from 90 to 100° C. to remove water to yield a solid reaction product that is plastic on heating.

2. The process of producing thermoplastic condensation products which comprises dissolving a mixture of urea and ammonium thiocyanate in an aqueous solution of formaldehyde, the formaldehyde being present in quantities sufficient to form resinous products with the urea and ammonium thiocyanate, permitting the components of the solution to react to form a solid reaction product, and heating such product to remove water to yield a solid reaction product that is plastic on heating.

3. The process of producing thermoplastic condensation products which comprises dissolving urea, thiourea and ammonium thiocyanate in an aqueous solution of formaldehyde, the formaldehyde being present in quantities sufficient to form resinous products with the urea, thiourea and ammonium thiocyanate, permitting the components of the solution to react to form a solid reaction product, and heating such product to remove water to yield a solid reaction product that is plastic on heating.

CARLETON ELLIS.